(12) United States Patent
Röhrig

(10) Patent No.: US 6,546,583 B1
(45) Date of Patent: Apr. 15, 2003

(54) TOOTHBRUSH

(75) Inventor: Peter Röhrig, Vienna (AT)

(73) Assignee: Bamed AG, Altendorf (CH)

( * ) Notice: Subject to any disclaimer, the term of this patent is extended or adjusted under 35 U.S.C. 154(b) by 70 days.

(21) Appl. No.: 09/661,020

(22) Filed: Sep. 13, 2000

(30) Foreign Application Priority Data

Jul. 11, 2000 (AT) ............................... MU 2604-05/2000

(51) Int. Cl.⁷ ........................... A47L 13/12; A46B 9/04; A46B 5/02
(52) U.S. Cl. ........................ 15/110; 15/143.1; 15/167.1
(58) Field of Search ............................... 15/110, 143.1, 15/167.1

(56) References Cited

U.S. PATENT DOCUMENTS

| | | | |
|---|---|---|---|
| 1,153,409 A | * | 9/1915 | Wheeler |
| 1,963,360 A | * | 6/1934 | Gibbin |
| D100,125 S | * | 6/1936 | Rominger |
| 2,079,728 A | * | 5/1937 | Arnold |
| D107,228 S | * | 11/1937 | Goodman |
| D123,254 S | * | 10/1940 | Williams |
| 3,010,131 A | * | 11/1961 | Kisky |
| 3,067,446 A | * | 12/1962 | McGauley |
| 5,048,143 A | * | 9/1991 | Carroll |
| 5,571,140 A | * | 11/1996 | Gura-Emerling |
| 5,623,739 A | * | 4/1997 | Thompson |
| 5,802,656 A | * | 9/1998 | Dawson |

FOREIGN PATENT DOCUMENTS

| | | | |
|---|---|---|---|
| CA | 2212398 | | 3/1999 |
| DE | 86209450 | | 1/1987 |
| EP | 0126505 | | 4/2001 |
| FR | 94359 | * | 6/1969 |
| FR | 2522944 | * | 9/1983 |
| GB | 365706 | | 1/1932 |
| WO | 4029719 A1 | | 3/1992 |

* cited by examiner

*Primary Examiner*—Randall E. Chin
(74) *Attorney, Agent, or Firm*—Ladas & Parry

(57) ABSTRACT

A toothbrush comprising a handle at one end of which a bristle portion is provided for cleaning the teeth, whereas at the opposite end of the handle, a massaging portion is provided; the massaging portion being integrally formed with the handle and substantially having the shape of a convex body.

17 Claims, 2 Drawing Sheets

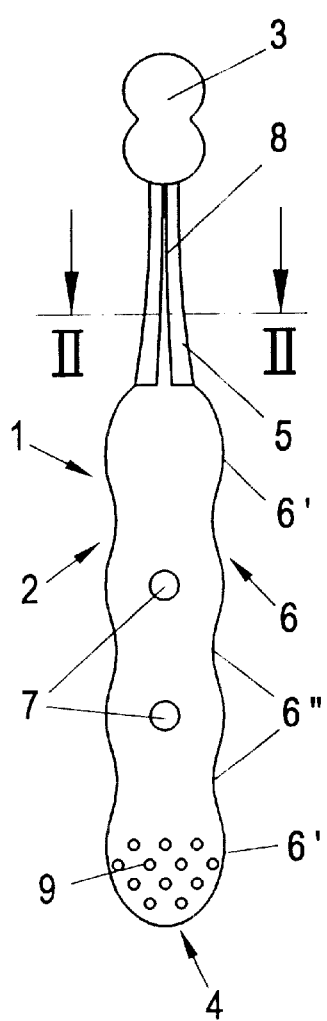
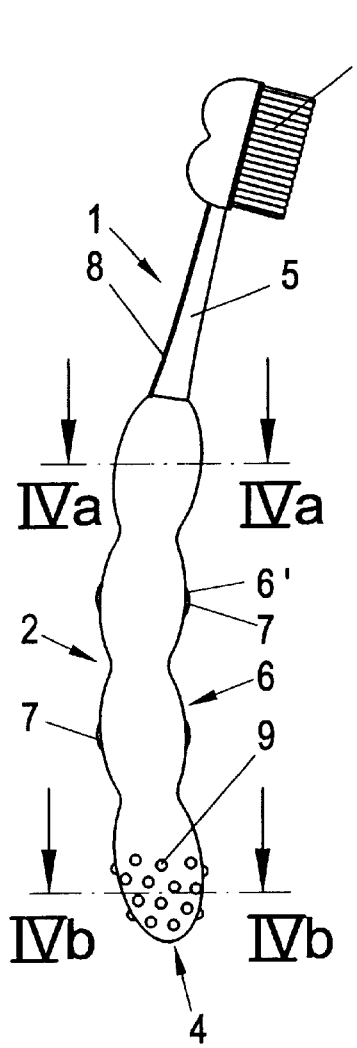
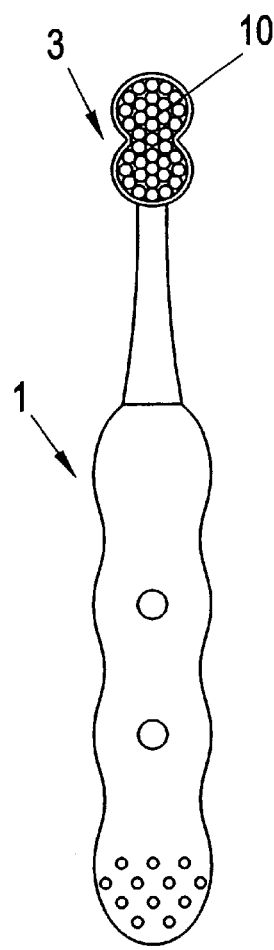
FIG. 1
FIG. 3
FIG. 5
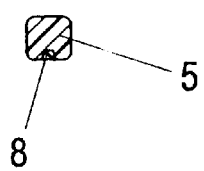
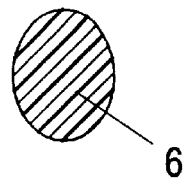
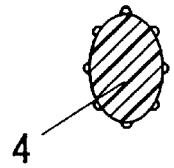
FIG. 2
FIG. 4a
FIG. 4b U.S. Patent        Apr. 15, 2003        Sheet 2 of 2        US 6,546,583 B1

TOOTHBRUSH

FIELD OF THE INVENTION

The invention relates to a toothbrush comprising a handle, with a bristle portion for cleaning the teeth being provided at a first end of the handle, and a massaging portion being provided at a second end of the handle opposite the bristle portion.

BACKGROUND OF THE INVENTION

As a rule, toothbrushes in one end region of a handle comprise a bristle portion for cleaining the teeth and, moreover, also for massaging the gums. However, since the bristles are mainly used in the comparatively sensitive transition region between teeth and gums, they are relatively soft so as not to cause any injuries of the gums in this region. Therefore, it has already been known to provide a massaging portion at the end of the handle opposite the bristle portion, which massaging portion exclusively serves for massaging the gums and which does not have any bristles jeopardizing the gums.

From DE 40 29 719 A1, a toothbrush is known in which at the end of the handle opposite the bristle portion, one of several additional parts comprising differently shaped massaging elements may be attached. This additional massaging part is mounted on the handle via a plug-in fit and comprises exchangeable rotatable rollers or wheels for massaging the gums. However, the provision of this additional massaging part results in a comparatively complex, expensive construction, which, moreover, is failure-prone as a consequence of the movable elements, and, furthermore, has a relatively sharp transition between handle and massaging part, possibly resulting in injuries in the gum or inner lip and cheek regions, respectively.

SUMMARY OF THE INVENTION

It is an object of this invention to provide a toothbrush of the initially defined type, which is easy to produce and which comprises a massaging portion by which risks of injuries in the gum region as well as in the inner lip and cheek regions can be prevented.

It is a further object of the invention to provide a toothbrush comprising a massaging portion which is particularly well suited for being introduced into the space between gums and lip, or cheek, respectively.

In the toothbrush according to the invention, the massaging portion is formed integrally with the handle and has the shape of an at least partially convex body. The body may be cambered, partially flattened, and it may also be textured so as to improve the massaging effect. By "textured", a surface having elevations, a rough, fluted or the like profiled surface is to be understood.

By designing the massage portion to be integral with the handle, at least a substantially continuous, gap-free transition can be provided between the handle and the massaging portion which reduces the risk of injuries in the gum region as well as in the inner lip and cheek regions; the shape of the at least partially convex body (e.g. spherical, spherical-segment-shaped, egg-shaped, paraboloidal, ellipsoidal or also tongue-shaped) contributes to this, since sharp edges or corners are avoided by which injuries could possibly be caused by an untrained user of the toothbrush. In this manner, a toothbrush which is particularly suitable for children is obtained which may be used by children without any reservations, since also with still untrained handling of the toothbrush, the risk of an injury in the region of the gums as well as in the inner lip and cheek regions is minimized by the afore-mentioned design of the massaging portion. Moreover, it is also possible to use the massaging portion as a tongue scraper for cleaning of the tongue, in addition to massaging. A further, not unsubstantial advantage of the one-piece design is that by the continous, gap-free connection, a simple and reliable cleaning is possible resulting in a hygienically advantageous toothbrush including a massaging portion, with which infections may effectively be prevented.

To obtain a relatively large massaging surface, on the one hand, and to design the massaging portion relatively flat, on the other hand, and to enable a simple and agreeable introduction of the massaging portion between lip and cheek, respectively, and the gums it is advantageous if the massaging portion has a substantially elliptical cross-section.

To achieve a soothing effect with the massaging element when massaging the gums, particularly to alleviate pain caused by inflamed gums in teething infants, it is advantageous if the massaging portion comprises projecting, e.g. knob-like, massaging elements. In this connection, it is also advantageous if the projecting massaging elements or, generally, textures are designed differently on the front and rear sides.

If the massaging portion comprises projecting massaging elements which are substantially linear and extend substantially perpendicular to the longitudinal axis of the toothbrush, a tooth gel may be inserted in the regions between the linear massaging elements, which later on may be massaged into the gums by aid of the massaging portion. This is particularly advantageous for alleviating the pain when infants are teething, where so far commonly the parents had to apply a tooth gel with their fingers so as to alleviate pain; this might result in the transmission of germs, or slight injuries might be caused by the fingernails.

For a continuous transition without any steps from the handle to the massaging portion and for a good handling of the toothbrush it is advantageous if the handle has a substantially elliptical cross-section at least over part of its longitudinal extension.

For further improving the grip on the toothbrush, it is suitable if the handle comprises narrowed and widened partial regions over at least part of its longitudinal extension. In this manner, depressions are formed between the widened partial regions by the narrowed partial regions, in which the fingers of the user of the toothbrush come to lie, thus preventing slipping of the fingers in the longitudinal direction of the toothbrush.

To avoid possible sharp edges on the handle which would substantially reduce the comfortable using of the toothbrush it is suitable if continuous transitions are provided between the narrowed and the widened partial regions of the handle.

If each one of the widened partial regions of the handle has at least two projecting gripping knobs the risk of the handle slipping in one's hand in the longitudinal and radial directions of the toothbrush can be further reduced.

In a preferred exemplary embodiment of the invention, in which the final widened partial region of the handle constitutes the massaging portion, a particularly compact and esthetic toothbrush will result in which the transition from the handle to the massaging portion is a continuous one.

To make the toothbrush more torsion-proof in the region of the bristle portion, it is advantageous if the handle comprises a neck portion of substantially rectangular cross-section which is followed by the bristle portion. The neck portion of substantially rectangular cross-section suitably has rounded corner regions so that particularly in the transition range to the handle portion of substantially elliptical cross-section, a continuous transition without any steps is achieved by well-rounded corners.

To enable common handling of the toothbrush by a child and an adult to thus help the child learn the correct movements, it is advantageous if the handle comprises an extension portion followed by the massaging portion. In this manner, the adult may grip the extension portion which serves as a guide, while the child grips the toothbrush on the remaining handle, whereby the child can be taught the correct movements for cleaning the teeth in a simple manner.

For a good control of the strength of the handle and its neck portion, respectively, when pressing the bristle part at the gums and at the teeth, respectively, it is advantageous if the handle is injection-moulded of a multi-component plastic material. In this manner, it is also possible to obtain a multi-colored design which is particularly interesting and appealing to children.

If the material components of the handle have different moduli of elasticity, the resultant toothbrush not only will be optically pleasing because it may comprise several colors in a simple manner due to the several components used, but the toothbrush may also have different stiffnesses in different partial regions corresponding to the requirements during the cleaning procedure.

In particular, it is suitable if the massaging element and the handle as well as connecting webs between them are made of a plastic component having a lower modulus of elasticity, and the remaining parts of the toothbrush, optionally the neck portion and the extension portion, are made of a plastic component having a higher modulus of elasticity. In this manner, yielding of the neck portion at a relatively high pressure at the gums may be achieved, whereby injuries in the gum region by the bristles will be avoided, and, on the other hand, a massaging portion which is relatively hard as compared to the bristles can be obtained which is particularly suitable to alleviate the pain when infants are teething.

BRIEF DESCRIPTION OF THE DRAWINGS

The invention will now be explained in more detail by way of preferred exemplary embodiments illustrated in the drawings to which, however, it shall not be restricted. In detail, FIG. 1 shows a view of the rear side of a toothbrush;

FIG. 2 shows a cross-section through the neck portion of the toothbrush according to line II—II of FIG. 1;

FIG. 3 shows a side view of this toothbrush;

FIG. 4a shows a cross-section according to line IVa—IVa of FIG. 3;

FIG. 4b shows a cross-section according to line IVb—IVb of FIG. 3;

FIG. 5 shows a view of the front side of the toothbrush according to FIGS. 1 and 3;

DESCRIPTION OF PREFERRED EXEMPLARY EMBODIMENTS

Figure 6:
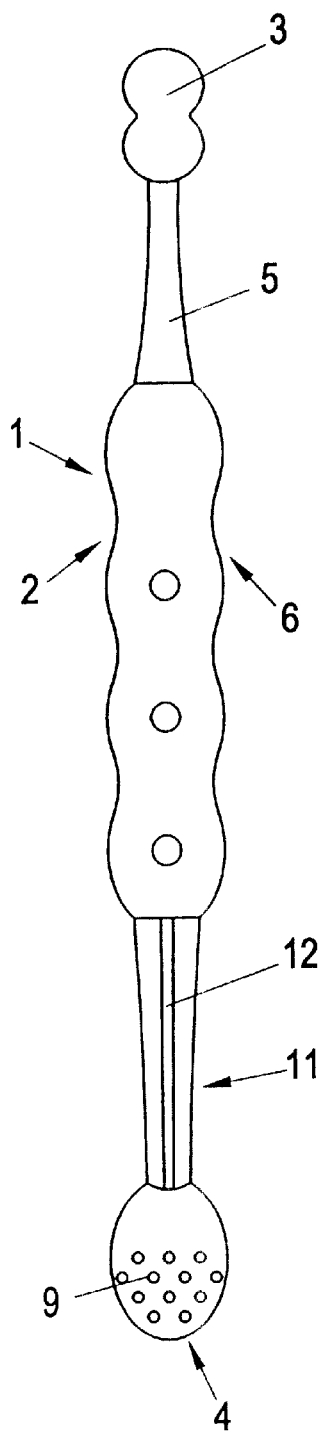
FIG. 6 shows a view of the rear side of a toothbrush which at least at present is particularly preferred and which has an extension portion.

In FIGS. 1 to 5, a toothbrush 1 comprising a handle or stem 2 is shown, wherein a bristle portion 3 is provided in one end region of the handle 2, and a massaging portion 4 is provided in the end portion opposite the bristle portion 3. The handle 2 comprises a neck portion 5 and a handle portion 6 proper.

In the handle portion 6, widened partial regions 6' and narrowed partial regions 6" are provided which merge into each other continuously, thus resulting in a type of wave-shaped handle section which makes slipping of the toothbrush 1 in one's hand in longitudinal direction more difficult. To additionally reduce the risk of an undesired slipping, and, in particular, rotation of the toothbrush 1, gripping knobs 7 may be provided in the widened partial ranges 6', and particularly in each partial region, such grip knobs 7 may be provided on the broad sides of the handle portion 6 of substantially elliptical cross-section.

For stiffening purposes, the neck portion 5 may consist of a different, stiffer plastic material than the handle portion 6 and the bristle portion 3, and a connecting web 8 may extend from the handle portion 6 to the bristle portion 3 which is made of the same material as the handle portion 6.

The handle 2 with the bristle portion 3 and the massaging portion 4 may, e.g., be injection-moulded from a two-component plastic, thus also enabling an optically attractive appearance by a two-colored design. Moreover, the two material components may have different material stiffnesses, with particularly the handle portion 6, the connecting web 8 and the bristle portion 3 and the massaging portion 4 possibly being made of a softer material, as for instance a thermoplastic elastomer, than the neck portion 5 which may be comprised of e.g. polypropylene.

The massaging portion 4 which in the exemplary embodiment illustrated in FIGS. 1 to 5 is directly formed by the last, widened partial region 6', is shaped in one piece with the handle 2 as an entirely cambered, convex body, i.e. a convexly curved part, and it has a texture in the form of projecting, knob-like massaging elements 9 on its entire surface (cf. also FIG. 4b) which may serve to sooth the gums of an infant which are inflamed due to teething. To avoid sharp edges and corners, respectively, in the transition zone from the massaging element 4 to the handle 2 and on the massaging element 4 itself, the latter substantially has the shape of an ellipsoid (cf. also FIG. 4b) and follows the handle 2 continuously, without any steps. The massaging portion 4 may, however, also have the shape of other arched bodies or parts thereof, e.g. spherical segment, paraboloid etc.

From FIG. 2 it appears that the neck portion 5 is substantially rectangular in cross-section, the corners of the basic rectangular shape, however, being well rounded. In particular, the rectangular cross-sectional shape of the neck portion 5, which is provided to make the neck portion 5 more torsion-proof, exhibits ever increasing roundings of the corners towards the handle portion 6, resulting in a continuous transition to the elliptical cross-sectional shape of the handle portion 6 which can be seen from FIG. 4a.

In FIG. 3, the bristles 10 attached on the bristle portion 3 for cleaning the teeth and for massaging the gums can be seen. Furthermore, it can be seen that the gripping knobs 7 in the widened partial regions 6' of the handle portion 6 are provided on both broad sides.

The shape of the handle portion 6 being substantially elliptical in cross-section (cf. FIG. 4a), results in an extremely handy shape of the handle portion 6 and, moreover, allows for a continuous transition to the massaging portion 4 (cf. FIG. 4b). On account of the ellipsoidal shape of the massaging portion 4, the latter can be introduced very easily into the space between lip or cheek, respectively, and gums, and because its shape does not have any edges, the risk of injury, particularly with untrained infants, is greatly reduced, resulting, moreover, in a hygienically perfect, easy-to-clean configuration.

The bristles 10 of the bristle part 3 illustrated in FIG. 5 may be multicolored to get a colorful, attractive appearance for the preferred user of the toothbrush, i.e. infants.

Figure 7:
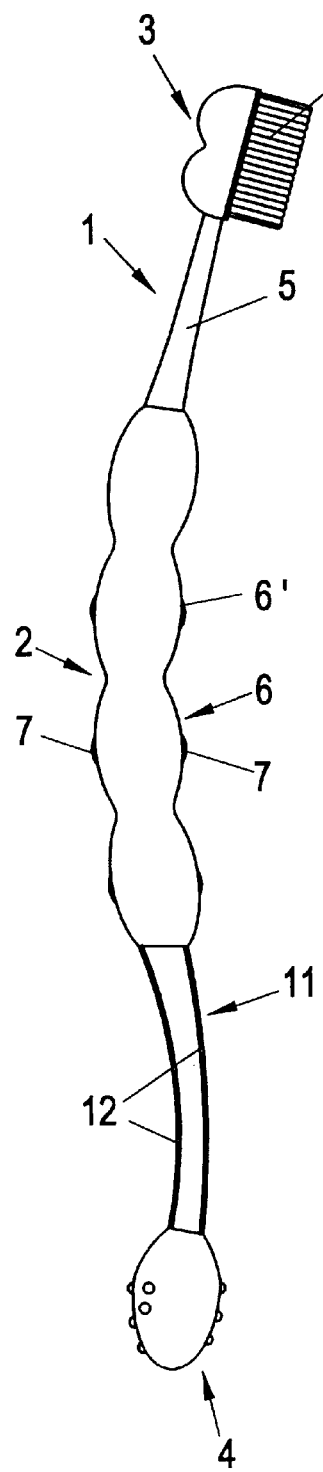
FIG. 7 shows a side view of the toothbrush according to FIG. 6.

In the exemplary embodiment of the inventive toothbrush 1 illustrated in FIGS. 6 and 7 and intended for somewhat older children, an extension portion 11 is provided which should also make it possible for an adult to control the movements of the toothbrush 1 performed by the child, if the child takes the toothbrush 1 by its handle portion 6, so as to make it easy for the child to learn the movements suitable for cleaning the teeth. In case of a production by a two-component injection moulding, the extension portion 11 may be made of a stiffer plastic, as has been mentioned before, with connecting webs 12 made of the softer plastic material extending from the handle portion 6 to the massaging portion 4.

The extension portion 11 is integrally followed by the substantially ellipsoidal massaging portion 4, which is textured and comprises several massaging elements 9 in the form of projecting knobs.

As is particularly apparent from FIG. 7, again gripping knobs 7 are provided on the broad sides of the widened partial regions 6' of the handle portion 6 so as to reduce the risk of the toothbrush 1 slipping and to thus make handling more comfortable for the child gripping the handle portion 6.

Figure 8:
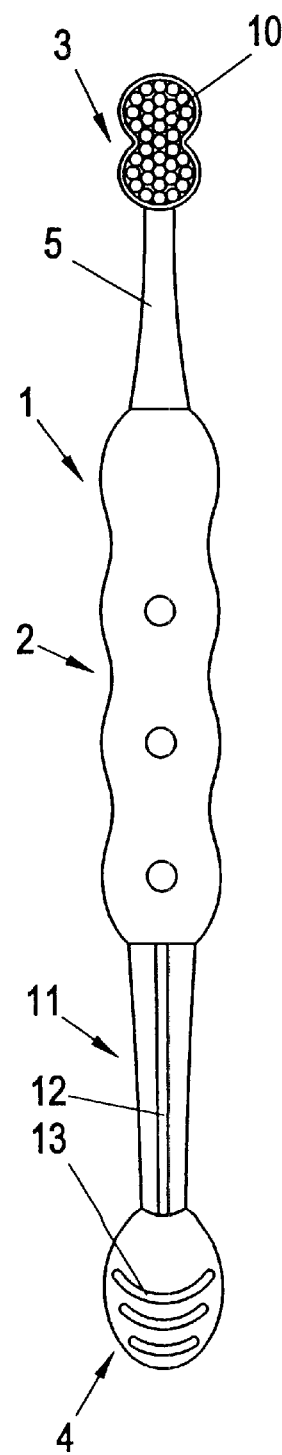
FIG. 8 shows a view of a front side of a toothbrush including elongate, projecting massaging elements provided on the massaging portion.

FIG. 8 shows a front view of an embodiment of the toothbrush 1 which is somewhat modified as compared to FIGS. 6 and 7 and in which elongate, raised webs 13 extending transversely to the longitudinal direction of the toothbrush are provided on the massaging portion 4 as said massaging elements; these webs 13 are particularly well suited to apply a tooth gel in the spaces between them which then may be applied by aid of the toothbrush 1 onto the inflamed gums of a teething infant. It is, of course, also possible to apply a tooth gel with the embodiments comprising the knob-shaped massaging elements 9. It is particularly preferred, if different textures or massaging elements, e.g. the elements 9 and 13, respectively, are provided on the two sides of the toothbrush 1, as is apparent from FIG. 6, on the one hand (rear side), and from FIG. 8, on the other hand (front side).

In toothbrushes 1 according to FIGS. 6 to 8, furthermore, again the neck portion 5, optionally together with the bristle portion 3, may be made of a somewhat harder plastic. Thereinstead, production of a single plastic material is, however, also conceivable.

What is claimed is:

1. A toothbrush comprising an elongated, bar-shaped handle having a first and a second end, said handle being made of a multi-component plastic material, said components having different moduli of elasticity, said handle including a handle portion and neck portion, wherein a bristle portion for cleaning teeth is provided on said first end, of the handle and wherein a massaging portion for massaging gums is provided on said second end located opposite said bristle portion, said massaging portion having the shape of an at least partially convex body and being in one-piece with said handle and being made of the plastic material having a lower modulus of elasticity as compared to the plastic material of the neck portion.

2. A toothbrush as set forth in claim 1, wherein said massaging portion has a substantially elliptical cross-section.

3. A toothbrush as set forth in claim 1, wherein said massaging portion is textured.

4. A toothbrush as set forth in claim 3, wherein said massaging portion comprises projecting massaging elements.

5. A toothbrush as set forth in claim 4, wherein said massaging elements are knob-shaped.

6. A toothbrush as set forth in claim 4, wherein said projecting massaging elements are substantially linearly extending, projecting massaging elements, said massaging elements extending in a plane substantially perpendicular to a longitudinal axis of said toothbrush.

7. A toothbrush as set forth in claim 4, wherein said massaging elements are different on different sides of said massaging portion.

8. A toothbrush as set forth in claim 1, wherein said handle portion has a substantially elliptical cross-section at least over part of its longitudinal extension.

9. A toothbrush as set forth in claim 1, wherein said handle portion comprises narrowed and widened partial regions over at least part of its longitudinal extension.

10. A toothbrush as set forth in claim 9, wherein continuous transitions are provided between said narrowed and said widened partial regions of said handle portion.

11. A toothbrush as set forth in claim 9, wherein said widened partial regions of said handle portion each comprise at least two projecting gripping knobs.

12. A toothbrush as set forth in claim 9, wherein the last widened partial region of said handle portion constitutes said massaging portion.

13. A toothbrush as set forth in claim 1, wherein said neck portion has a substantially rectangular cross-section, said neck portion being followed by said bristle portion.

14. A toothbrush as set forth in claim 1, wherein said handle portion comprises an extension portion, said extension portion being followed by said massaging portion.

15. A toothbrush as set forth in any one of claims 1 to 14, wherein said handle portion is injection-moulded of a multi-component plastic material.

16. A toothbrush as set forth in claim 15, wherein said handle portion has material components with different moduli of elasticity.

17. A toothbrush as set forth in claim 16, wherein said massaging element, said handle portion, and connecting webs which connect said handle portion to said bristle portion, are made of a plastic component having a lower modulus of elasticity as compared to remaining portions of said toothbrush.

* * * * *